(12) United States Patent
Watanabe

(10) Patent No.: US 8,559,713 B2
(45) Date of Patent: Oct. 15, 2013

(54) COMPUTER READABLE STORAGE MEDIUM, IMAGE CORRECTION APPARATUS, AND IMAGE CORRECTION METHOD

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 12/923,366

(22) Filed: Sep. 16, 2010

(65) Prior Publication Data

US 2011/0064306 A1 Mar. 17, 2011

Related U.S. Application Data

(63) Continuation of application No. PCT/JP2008/072043, filed on Dec. 4, 2008.

(30) Foreign Application Priority Data

Mar. 18, 2008 (JP) ................................ 2008-070175

(51) Int. Cl.
*G06K 9/00* (2006.01)
(52) U.S. Cl.
USPC ........................................................ 382/167
(58) Field of Classification Search
None
See application file for complete search history.

(56) References Cited

U.S. PATENT DOCUMENTS

| 4,731,662 | A  * | 3/1988  | Udagawa et al. ............. 358/530 |
| 6,157,126 | A  * | 12/2000 | Yano et al. .................... 313/485 |
| 6,242,857 | B1 * | 6/2001  | Hashimoto et al. ........... 313/485 |
| 6,369,899 | B1 * | 4/2002  | Hamada ......................... 356/603 |
| 6,556,312 | B1 * | 4/2003  | Nagatani ........................ 358/1.9 |
| 6,642,930 | B1 * | 11/2003 | Matsuura et al. ............. 345/601 |
| 6,856,345 | B1 * | 2/2005  | Yamamoto et al. ........ 348/207.2 |
| 6,930,704 | B1 * | 8/2005  | Hamada ........................... 348/42 |
| 7,139,425 | B2   | 11/2006 | Takahashi |
| 7,623,160 | B2 * | 11/2009 | Chino et al. ............... 348/223.1 |
| 8,116,522 | B1 * | 2/2012  | Buck et al. ..................... 382/103 |
| 2001/0028796 | A1 * | 10/2001 | Yamanaka et al. ............ 396/281 |
| 2001/0043277 | A1 * | 11/2001 | Tanaka et al. ............ 348/333.01 |
| 2002/0044685 | A1 * | 4/2002  | Takahashi ..................... 382/167 |
| 2003/0048374 | A1 * | 3/2003  | Minakuti et al. .............. 348/360 |

(Continued)

FOREIGN PATENT DOCUMENTS

| JP | 2000-13626  | 1/2000 |
| JP | 2000-148978 | 5/2000 |

(Continued)

OTHER PUBLICATIONS

International Search Report for PCT/JP2008/072043, mailed Jan. 13, 2009.

(Continued)

*Primary Examiner* — Barry Drennan
*Assistant Examiner* — Feng Niu
(74) *Attorney, Agent, or Firm* — Staas & Halsey LLP

(57) ABSTRACT

An image correction apparatus includes a color temperature calculating unit that calculates a color temperature of a highlighted portion of image data captured with an image capturing unit, a distance determining unit that determines whether the color temperature calculated by the color temperature calculating unit is within a certain distance with respect to a value on a daylight locus, and an image correction unit that corrects the image data using color balance correction when the color temperature is determined to be within the certain distance with respect to the value on the daylight locus by the distance determining unit.

7 Claims, 5 Drawing Sheets

(56) References Cited

U.S. PATENT DOCUMENTS

| | | | |
|---|---|---|---|
| 2003/0053088 A1* | 3/2003 | Kanai et al. | 358/1.9 |
| 2004/0165769 A1* | 8/2004 | Huh et al. | 382/162 |
| 2005/0213128 A1* | 9/2005 | Imai et al. | 358/1.9 |
| 2006/0066912 A1* | 3/2006 | Kagaya | 358/302 |
| 2006/0078216 A1* | 4/2006 | Kaku | 382/254 |
| 2006/0181618 A1* | 8/2006 | Kameyama | 348/234 |
| 2006/0290957 A1* | 12/2006 | Kim et al. | 358/1.9 |
| 2006/0291016 A1* | 12/2006 | Ishigami et al. | 358/518 |
| 2007/0085816 A1* | 4/2007 | Evanicky et al. | 345/102 |
| 2007/0126887 A1* | 6/2007 | Chino et al. | 348/223.1 |
| 2008/0024523 A1* | 1/2008 | Tomite et al. | 345/632 |
| 2009/0309996 A1 | 12/2009 | Iguchi et al. | |
| 2009/0324061 A1* | 12/2009 | Odgers | 382/162 |
| 2011/0091104 A1 | 4/2011 | Yamazoe et al. | |

FOREIGN PATENT DOCUMENTS

| | | |
|---|---|---|
| JP | 2002-152772 | 5/2002 |
| JP | 2003-169222 | 6/2003 |
| JP | 2003-339057 | 11/2003 |

OTHER PUBLICATIONS

Japanese Office Action issued Aug. 10, 2011 in corresponding Japanese Patent Application 2008-070175.

* cited by examiner

FIG.2
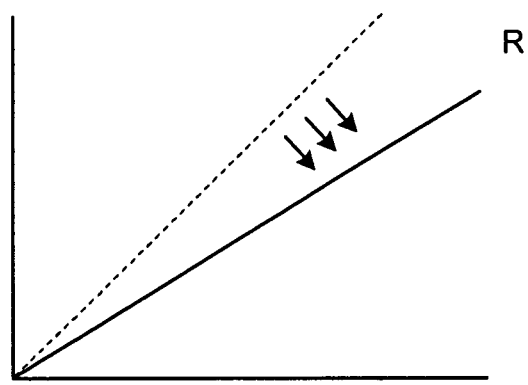
R
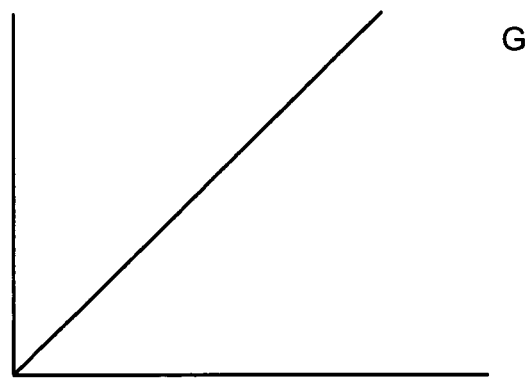
G
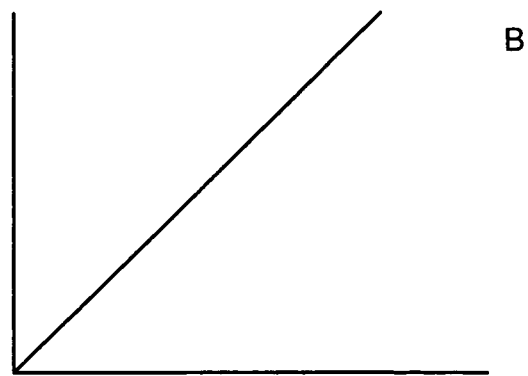
B

COMPUTER READABLE STORAGE MEDIUM, IMAGE CORRECTION APPARATUS, AND IMAGE CORRECTION METHOD

CROSS-REFERENCE TO RELATED APPLICATION(S)

This application is a continuation of International Application No. PCT/JP2008/072043, filed on Dec. 4, 2008 which claims the benefit of priority from Japanese Patent Application No. 2008-070175, filed on Mar. 18, 2008, the entire contents of which are incorporated herein by reference.

FIELD

The embodiments discussed herein are directed to a computer readable storage medium, an image correction apparatus, and an image correction method for performing a correction process on captured image data.

BACKGROUND

It is known that humans are adaptable enough to properly perceive the original color of an object even when the light source environment changes. In contrast, with digital cameras, a color cast phenomenon occurs in which captured images become bluish or reddish depending on the light sources (i.e., the difference in "color temperature").

Color balance correction (or white balance correction) has been performed as a technology for correcting images in which such a color cast phenomenon occurs (for example, see Japanese Laid-open Patent Publication No. 2002-152772). For example, images are corrected, using color balance correction, by obtaining gray candidate pixels in the image and making these pixels closer to prescribed gray points located on a daylight locus.

However, with the technology for performing the color balance correction described above, because bright and dark pixels are extracted as grey candidate pixels without distinguishing whether the extracted pixel is actually a bright or a dark pixel, it is difficult to tell whether the captured color has a "color cast" due to the difference in color temperatures of light sources or the captured color is the actual original color of the object. Accordingly, in some cases, a color cast may not be appropriately corrected due to erroneous correction.

SUMMARY

According to an aspect of an embodiment of the invention, a computer readable storage medium has stored therein an image correction program. The image correction program causes a computer to execute a process including: calculating a color temperature of a highlighted portion of image data captured with an image capturing unit; determining whether the color temperature calculated in the calculating is within a certain distance with respect to a value on a daylight locus; and correcting the image data using color balance correction when the color temperature is determined to be within the certain distance with respect to the value on the daylight locus in the determining.

According to another aspect of an embodiment of the invention, an image correction apparatus includes: a color temperature calculating unit that calculates a color temperature of a highlighted portion of image data captured with an image capturing unit; a distance determining unit that determines whether the color temperature calculated by the color temperature calculating unit is within a certain distance with respect to a value on a daylight locus; and an image correction unit that corrects the image data using color balance correction when the color temperature is determined to be within the certain distance with respect to the value on the daylight locus by the distance determining unit.

According to still another aspect of an embodiment of the invention, an image correction method includes: calculating a color temperature of a highlighted portion of image data captured with an image capturing unit; determining whether the color temperature calculated in the calculating is within a certain distance with respect to a value on a daylight locus; and correcting the image data using color balance correction when the color temperature is determined to be within the certain distance with respect to the value on the daylight locus in the determining.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a schematic diagram explaining a look up table;

DESCRIPTION OF EMBODIMENT(S)

Preferred embodiments of the present invention will be explained with reference to accompanying drawings.

[a] First Embodiment

In the following embodiment, the configuration of an image correction apparatus according to a first embodiment and the flow of processing thereof are described in this order. Finally, advantages of the first embodiment will be described. In the following, a case in which image data captured with a digital camera is corrected and the corrected data is output to a printer connected thereto will be described.

Configuration of the Image Correction Apparatus

Figure 1:
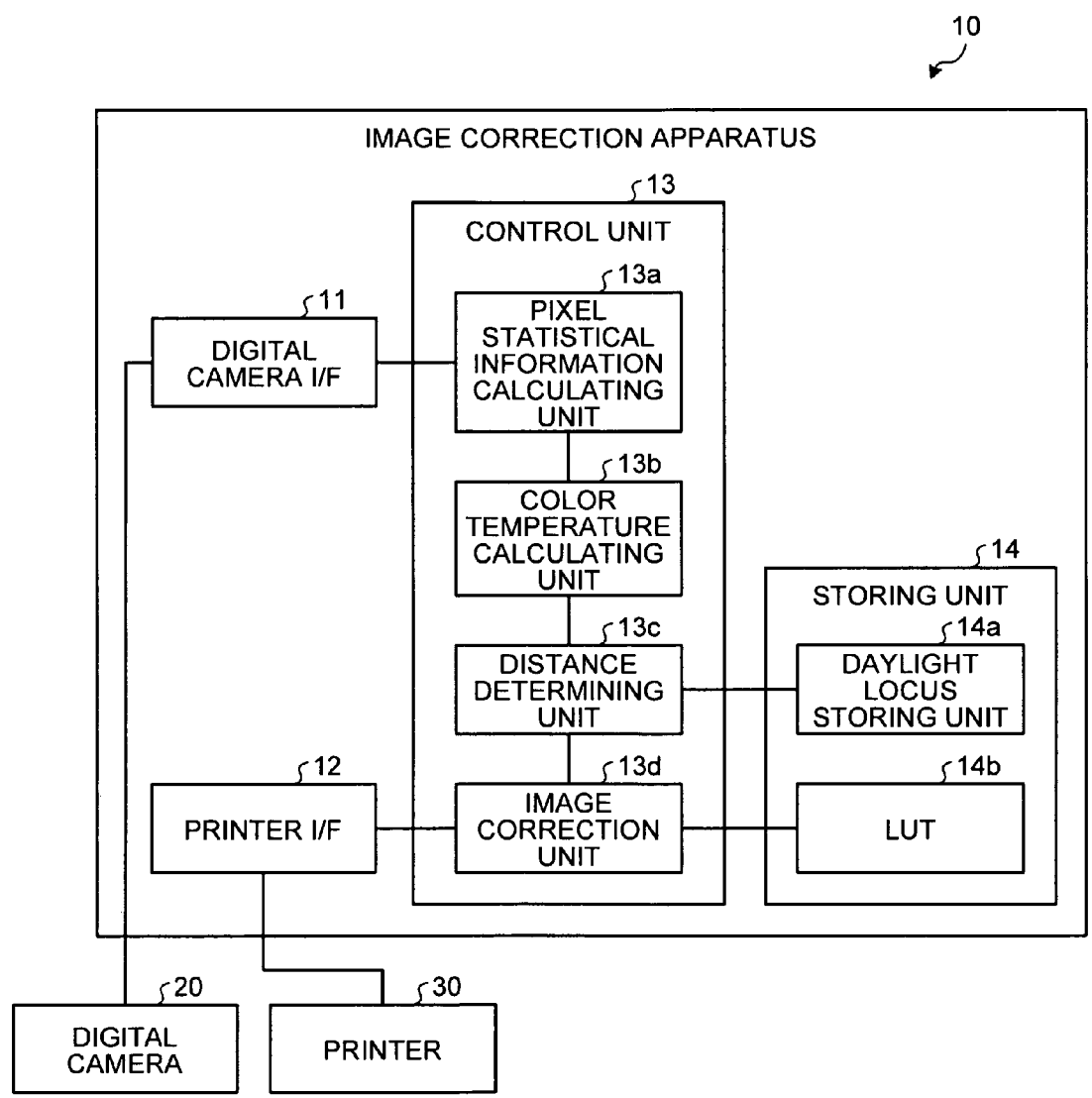
FIG. 1 is a block diagram illustrating the configuration of an image correction apparatus according to a first embodiment.

In the following, the configuration of an image correction apparatus 10 according to the first embodiment will be described with reference to FIG. 1. FIG. 1 is a block diagram illustrating the configuration of the image correction apparatus 10 according to the first embodiment. As illustrated in FIG. 1, the image correction apparatus 10 includes a digital camera I/F 11, a printer I/F 12, a control unit 13, and a storing unit 14. The image correction apparatus 10 is connected to a digital camera 20 and a printer 30 via a cable or a network. Processes performed by these units will be described below.

The digital camera I/F 11 controls the communication of various kinds of information exchanged with the digital camera 20 connected thereto. Specifically, the digital camera I/F 11 receives captured image data from the digital camera 20.

The printer I/F 12 controls the communication of various kinds of information exchanged with the printer 30 connected thereto. Specifically, the printer I/F 12 sends, to the printer 30, image data subjected to a correction process.

The storing unit 14 stores therein data and programs for various kinds of processes performed by the control unit 13. The storing unit 14 includes a daylight locus storing unit 14a and a look up table (hereinafter, referred to as an LUT) 14b, which are particularly and closely related to the present invention.

The daylight locus storing unit 14a stores therein information about a daylight locus, which is closely analogous to a curve of chromaticity coordinates obtained by plotting colors on the xy chromaticity diagram on the basis of the measurement result of daylight performed by the Commission Internationale de l'Eclairage (CIE).

As illustrated in FIG. 2, the LUT 14b stores therein a conversion table representing the correlation between input levels and output levels of RGB components. In the LUT 14b, when, for example, color balance correction is performed so that an output level of an R component is reduced, as in the example illustrated in FIG. 2, the conversion table is rewritten by a distance determining unit 13c, which will be described later. Then, in the LUT 14b, the conversion table is read by an image correction unit 13d, which will be described later, and is used for color balance correction.

The control unit 13 has an internal memory for storing data and programs prescribing various kinds of procedures, whereby various kinds of processes are executed. The control unit 13 includes a pixel statistical information calculating unit 13a, a color temperature calculating unit 13b, the distance determining unit 13c, and the image correction unit 13d, which are particularly and closely related to the present invention.

The pixel statistical information calculating unit 13a extracts a highlighted portion (e.g., pixels ranking in the top 1% of brightness luminance in an image) of image data and calculates pixel statistics (e.g., the average value of the pixels in a highlighted portion). Specifically, if the pixel statistical information calculating unit 13a receives image data from the digital camera 20, the pixel statistical information calculating unit 13a obtains a histogram of the brightness.

Then, the pixel statistical information calculating unit 13a extracts, as a highlighted portion of the image data, pixels ranking in the top 1% of brightness luminance in the image. Subsequently, the pixel statistical information calculating unit 13a calculates the average value of input levels of each of the RGB components of the extracted pixels and notifies the color temperature calculating unit 13b of the average value. The highlighted portion of the image data mentioned here may be conceived to be a bright portion of the image data, i.e., a portion of the image data representing something irradiated with a light source.

The color temperature calculating unit 13b calculates color temperature of the highlighted portion of the image data. Specifically, from the average value of the input levels of the RGB components notified from the pixel statistical information calculating unit 13a, the color temperature calculating unit 13b calculates "X, Y, and Z" using Equations (1), (2), and (3) below:

$$X=0.412453 \times R+0.35758 \times G+0.10423 \times B \tag{1}$$

$$Y=0.212671 \times R+0.71516 \times G+0.072169 \times B \tag{2}$$

$$Z=0.019334 \times R+0.119193 \times G+0.950227 \times B \tag{3}$$

Then, by using Equations (4) and (5) below, the color temperature calculating unit 13b calculates "x and y" using the "X, Y, and Z". Thereafter, by using Equations (6) and (7) below, the color temperature calculating unit 13b calculates, using "x and y", a color temperature T and notifies the color temperature T to the distance determining unit 13c.

Color temperature represents a value indicating the relative intensities of bluish light and reddish light contained in a light source that emits a certain color. The color temperature of a light source is the temperature of a perfect black body that radiates light of comparable hue to that light source. The color temperature is expressed in the unit Kelvin (K). Higher color temperature represents a bluish color, whereas lower color temperature represents a reddish color. The color temperature of sunlight in the daytime ranges from 5500 to 6000 K; the color temperature in the shade is higher than that and color temperature in a room is lower than that.

$$x=X/(X+Y+Z) \tag{4}$$

$$y=Y/(X+Y+Z) \tag{5}$$

$$T=-473\ n^3+3601\ n^2-6861\ n+5514.31 \tag{6}$$

$$n=(x-0.3320)/(y-0.1858) \tag{7}$$

The distance determining unit 13c determines whether the calculated color temperature is within a certain distance with respect to a value on a daylight locus. Specifically, when the distance determining unit 13c receives the color temperature from the color temperature calculating unit 13b, the distance determining unit 13c reads information on the daylight locus from the daylight locus storing unit 14a, and plots the received color temperature on the chromaticity diagram as in the example illustrated in FIG. 3 (in the example illustrated in FIG. 3, the distance determining unit 13c plots the color temperature on a "plotted point").

Then, the distance determining unit 13c measures the distance between the plotted point of the color temperature and a point, having the same color temperature as the plotted point, on the daylight locus; determines whether the distance is within the certain distance; and notifies the image correction unit 13d of the result of the distance determination. For the certain distance, different distances may be set in advance for each color temperature, or, a single distance may be set in advance regardless of the color temperature.

Furthermore, if the distance determining unit 13c determines that the distance is within the certain distance, the distance determining unit 13c rewrites the LUT 14b in accordance with the plotted point of the color temperature. In the example illustrated in FIG. 3, because the plotted point is in a red (R) region, the distance determining unit 13c rewrites, as in the example illustrated in FIG. 2, the conversion table of the R component in such a manner that the output level of the R component is reduced. Alternatively, instead of reducing the output level of the R component, it is also possible to raise both the output level of the G component and the output level of the B component.

If the distance determining unit 13c determines that the color temperature is within the certain distance with respect to the value on the daylight locus, the image correction unit 13d performs color balance correction on the image data. Specifically, the image correction unit 13d receives the result of the distance determination from the distance determining unit 13c. If the result of the distance determination is that the plotted point of the calculated color temperature is located within the certain distance with respect to the daylight locus, the image correction unit 13d performs the color balance correction using the LUT 14b and outputs the corrected image data to the printer 30. For the color balance correction, the image correction unit 13d converts, for example, a bright point, where colors are unnatural, i.e., biased, to white and performs the similar process on other pixels proportionately.

Furthermore, if the result of the distance determination is that the plotted point of the calculated color temperature is not located within the certain distance with respect to the value on the daylight locus, the image correction unit 13d, without performing the color balance correction, outputs the image data to the printer 30 by keeping the pixel values the same as the image data. In other words, if the plotted point of the calculated color temperature is located outside the certain distance, the image correction unit 13d does not perform the color balance correction recognizing it as representing the original color of an object. Alternatively, instead of not performing the color balance correction, it is possible to perform color balance correction weaker than the color balance correction that is performed when the plotted point is determined to be located within the certain distance.

Figure 3:
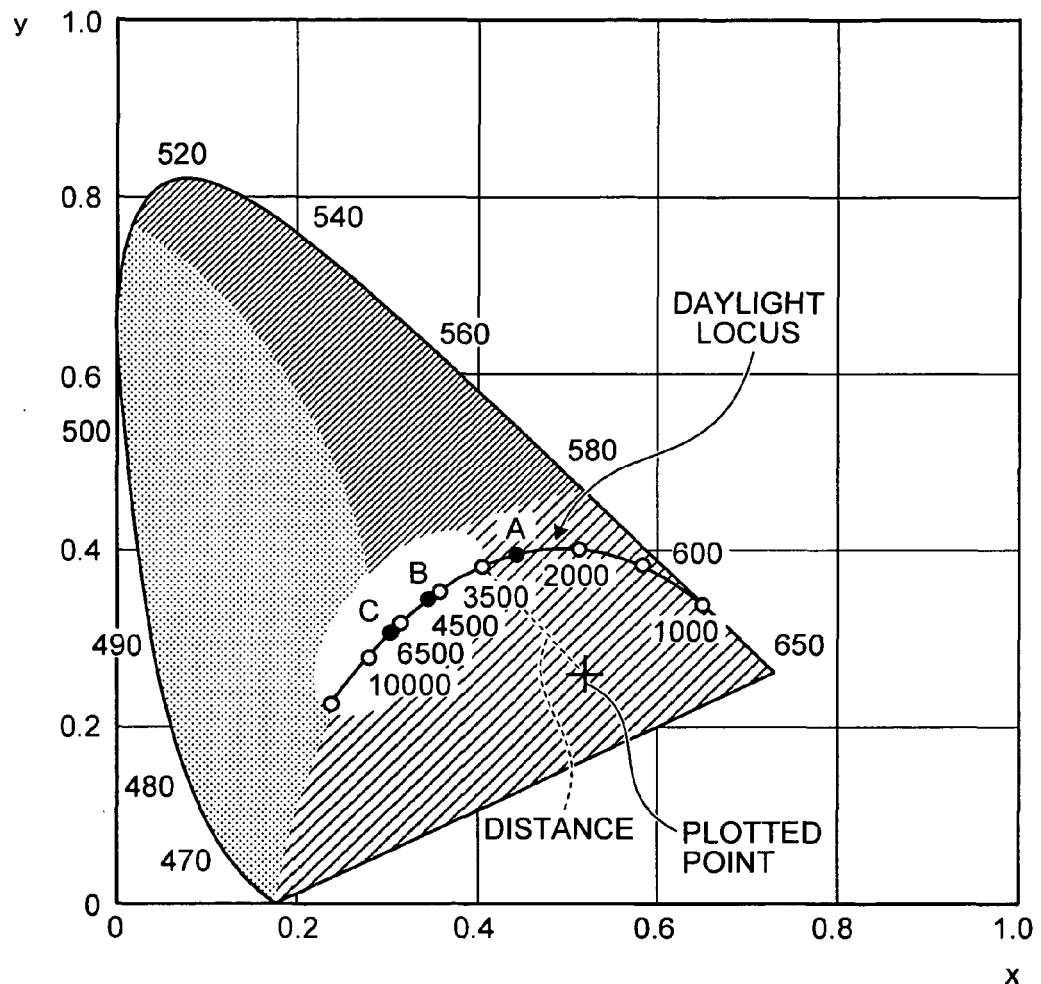
FIG. 3 is a schematic diagram explaining a process for determining, using a chromaticity diagram, the distance between a plotted point of a color temperature and a daylight locus.

A specific example will be described with reference to FIG. 3. In the example illustrated in FIG. 3, the color temperature calculating unit 13b calculates a color temperature "3500 Kelvin (K)". The image correction unit 13d determines whether the distance between the plotted point of the color temperature and a point of 3500 K on the daylight locus is within the certain distance. If the result of the determination is that the distance is within the certain distance, as in the example illustrated in FIG. 3, because the plotted point is in the red (R) region, the image correction unit 13d performs the color balance correction on all the pixels in the image data using the LUT 14b that is rewritten in such a manner that the output level of the R component is reduced.

Process Performed by the Image Correction Apparatus

Figure 4:
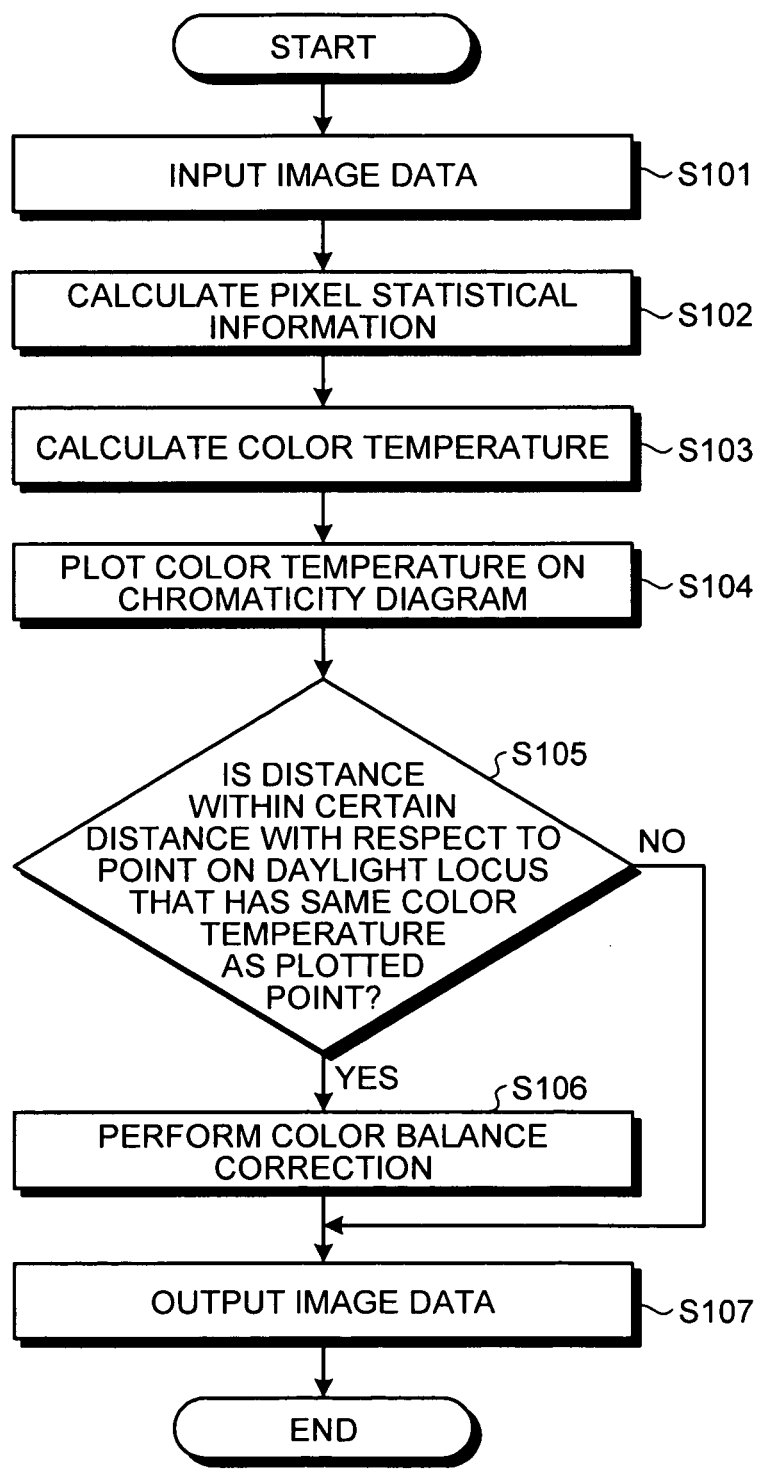
FIG. 4 is a flowchart explaining the flow of a process performed by the image correction apparatus according to the first embodiment.

In the following, a process performed by the image correction apparatus 10 according to the first embodiment will be described with reference to FIG. 4. FIG. 4 is a flowchart illustrating the flow of a process performed by the image correction apparatus 10 according to the first embodiment.

As illustrated in FIG. 4, if the image correction apparatus 10 receives image data from the digital camera 20 (S101), the image correction apparatus 10 obtains a histogram of the brightness; extracts a highlighted portion of the image data; and calculates pixel statistics (S102).

Then, the image correction apparatus 10 calculates the color temperature of the highlighted portion of the image data (S103). Subsequently, the image correction apparatus 10 plots the calculated color temperature on the chromaticity diagram (S104) and determines whether the distance between the plotted point of the color temperature and a point that is on the daylight locus and that has the same color temperature as the plotted point is within a certain distance (S105).

If the result of the determination is that the distance is within the certain distance (Yes at S105), the image correction apparatus 10 performs color balance correction (S106) and outputs the corrected image data to the printer 30 (S107). In contrast, if it is determined that the distance is not within the certain distance (No at S105), the image correction apparatus 10, without performing the color balance correction, outputs the image data to the printer 30 by keeping the pixel values the same as the image data (S107).

Advantage of the First Embodiment

As described above, the image correction apparatus 10 calculates the color temperature of the highlighted portion of the image data and determines whether the calculated color temperature is within the certain distance with respect to the value on the daylight locus. If it is determined that the color temperature is within the certain distance with respect to the daylight locus, the image correction apparatus 10 performs color balance correction on the image data. Accordingly, it is possible to make an assumption, in a precise manner, as to whether a color cast due to a color temperature of a light source occurs or whether the color is the original color of the object. If it is determined that a color cast has occurred, the image correction apparatus 10 performs the color balance correction to obtain well-balanced image data, thus appropriately correcting the color cast by preventing erroneous correction.

Furthermore, according to the first embodiment, if the color temperature is determined to be outside the certain distance with respect to the value on the daylight locus, the image correction apparatus 10 maintains the pixel values of the image data. Accordingly, it is possible to prevent erroneous correction in which the original color of the object is erroneously converted to white.

Furthermore, according to the first embodiment, the image correction apparatus 10 extracts pixels of the higher luminance ranking, from pixels in the image data, as a highlighted portion. The image correction apparatus 10 then calculates the average color temperature of these extracted pixels. In this case, unlike the case where the color temperature is calculated by extracting a single bright pixel as a highlighted portion, it is possible to prevent erroneous correction by reducing the occurrence of the mistaken extraction, as a highlighted portion, of pixels that have been affected by noise or the like rather than of pixels that have been irradiated with a light source.

[b] Second Embodiment

The embodiment of the present invention has been described; however, the present invention is not limited to the embodiment described above and may be implemented with various kinds of embodiments other than the embodiment described above. Therefore, another embodiment included in the present invention will be described below as a second embodiment.

[b-1] Digital Camera

In the first embodiment, a case in which the digital camera sends image data to an external image correction apparatus and the image correction apparatus corrects the image data is described; however the present invention is not limited thereto. For example, the image correction apparatus may be used in the digital camera, and a correction process may be performed on image data that is acquired by the digital camera itself.

[b-2] System Configuration, etc.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device may be configured by functionally or physically separating or integrating any of the units depending on various loads or use conditions. For example, the distance determining unit 13c may be integrated with the image correction unit 13d. Furthermore, all or a part of the processing functions performed by each unit may be implemented by a CPU and programs analyzed and executed by the CPU or all or a part of the processing functions performed by each unit may be implemented as hardware by wired logic.

Furthermore, of the processes described in the embodiments, the whole or a part of the processes that are mentioned as being automatically performed may be manually performed or the whole or a part of the processes that are mentioned as being manually performed may be automatically performed using known methods. Furthermore, the process procedures, the control procedures, the specific names, and the information containing various kinds of data or parameters indicated in the above specification and drawings may be arbitrarily changed unless otherwise noted.

[b-3] Programs

Figure 5:
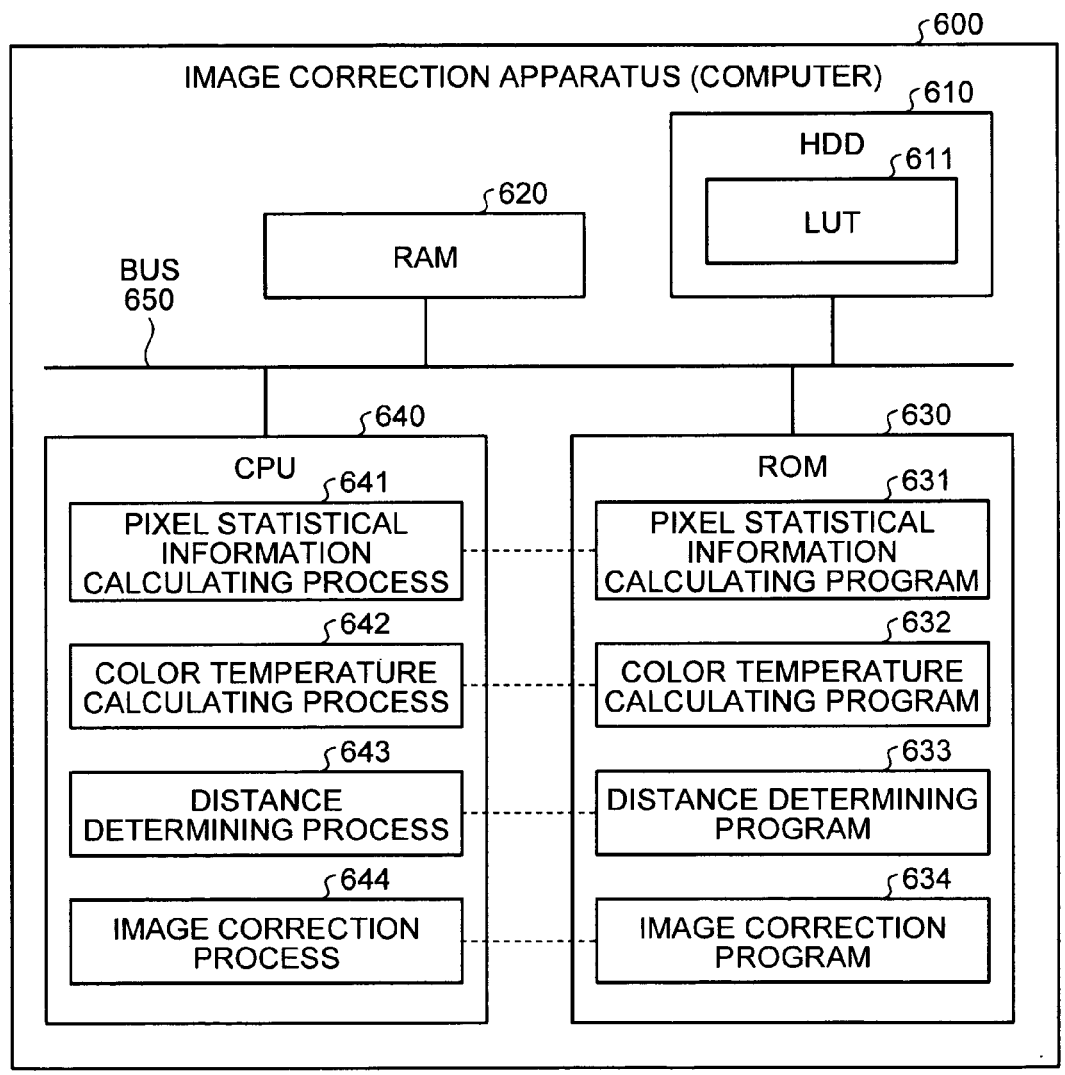
FIG. 5 is a block diagram illustrating a computer that executes an image correction program.

Various kinds of processes described in the above embodiment may be implemented by programs prepared in advance and executed by a computer. Accordingly, in the following, a computer that executes programs having the same function as those described in the embodiment described above will be described as an example with reference to FIG. 5. FIG. 5 is a block diagram illustrating a computer that executes an image correction program.

As illustrated in FIG. 5, a computer 600 serving as the image correction apparatus includes an HDD 610, a RAM 620, a ROM 630, and a CPU 640, which are connected via a bus 650.

The ROM 630 stores therein, in advance, an image correction program having the same function as the above-described embodiment. Specifically, the ROM 630 stores therein, as illustrated in FIG. 5, a pixel statistical information calculating program 631, a color temperature calculating program 632, a distance determining program 633, and an image correction program 634. These programs 631 to 634 may appropriately be integrated or separated in the same manner as the components of the image correction apparatus illustrated in FIG. 1.

As illustrated in FIG. 5, the CPU 640 reads these programs 631 to 634 from the ROM 630 and executes them so that these programs 631 to 634 may function as a pixel statistical information calculating process 641, a color temperature calculating process 642, a distance determining process 643, and an image correction process 644, respectively. These processes 641 to 644 correspond to the pixel statistical information calculating unit 13a, the color temperature calculating unit 13b, the distance determining unit 13c, and the image correction unit 13d, respectively, illustrated in FIG. 1.

As illustrated in FIG. 5, the HDD 610 includes an LUT 611 that corresponds to the LUT 14b illustrated in FIG. 1. The CPU 640 executes the image correction process using the LUT 611.

According to an aspect of the present invention, the disclosed apparatus determines, in a precise manner, whether a color of an object is the original color or a "color cast" due to the difference in color temperature of a light source, thus appropriately corrects a color cast by preventing erroneous correction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein an image correction program, the image correction program causing a computer to execute a process comprising:
calculating a color temperature of a highlighted portion of image data captured with an image capturing unit;
determining whether the color temperature calculated in the calculating is within a certain distance with respect to a value on a daylight locus; and
rewriting a conversion table that represents correlation between input levels and output levels of color components in accordance with the color temperature calculated in the calculating, and correcting, with reference to the conversion table, the image data using color balance correction when the color temperature is determined to be within the certain distance with respect to the value on the daylight locus in the determining, and
obtaining a histogram of brightness upon receiving the image data, extracting, as the highlighted portion of the image data representing a portion irradiated with a light source, pixels ranking in a top 1% of brightness luminance in the image data, and calculating, as a pixel statistic which is an average value of the pixels in the highlighted portion, the average value being input levels of each of RGB components of the extracted pixels,
wherein the determining includes measuring a distance between a plotted point of the color temperature and a point having the color temperature on the daylight locus, and determining whether the distance is within the certain distance.

2. The non-transitory computer readable storage medium according to claim 1, wherein the correcting includes maintaining a pixel value of the image data when the color temperature is determined to be outside the certain distance with respect to the value on the daylight locus in the determining.

3. The non-transitory computer readable storage medium according to claim 1, wherein the correcting includes performing a different color balance correction that is weaker than the color balance correction that is performed when the color temperature is determined to be within the certain distance, when the color temperature is determined to be outside the certain distance with respect to the value on the daylight locus in the determining.

4. The non-transitory computer readable storage medium according to claim 1, wherein the determining includes rewriting, when determining that the distance is within the certain distance, the conversion table in accordance with the plotted point of the color temperature, and
rewriting, when the plotted point is in a red (R) region, the conversion table of an R component in such a manner that the output level of the R component is reduced out of the R component, a G component, and a B component.

5. An image correction apparatus comprising:
a color temperature calculating unit that calculates a color temperature of a highlighted portion of image data captured with an image capturing unit;
a distance determining unit that determines whether the color temperature calculated by the color temperature calculating unit is within a certain distance with respect to a value on a daylight locus; and
an image correction unit that that rewrites a conversion table that represents correlation between input levels and output levels of color components in accordance with the color temperature calculated by the color temperature calculating unit, and corrects, with reference to the conversion table, the image data using color balance correction when the color temperature is determined to be within the certain distance with respect to the value on the daylight locus by the distance determining unit, and
a pixel statistical information calculating unit that obtains a histogram of brightness upon receiving the image data, extracts, as the highlighted portion of the image date representing a portion irradiated with a light source, pixels ranking in a top 1% of brightness luminance in the image data, and calculates, as a pixel statistic which is an average value of the pixels in the highlighted portion, the average value being input levels of each of RGB components of the extracted pixels, wherein the distance determining unit measures a distance between a plotted point of the color temperature and a point having the color temperature on the daylight locus, and determines whether the distance is within the certain distance.

6. An image correction method comprising:

calculating a color temperature of a highlighted portion of image data captured with an image capturing unit;

determining whether the color temperature calculated in the calculating is within a certain distance with respect to a value on a daylight locus; and rewriting a conversion table that represents correlation between input levels and output levels of color components in accordance with the color temperature calculated in the calculating, and correcting, with reference to the conversion table, the image data using color balance correction when the color temperature is determined to be within the certain distance with respect to the value on the daylight locus in the determining, and obtaining a histogram of brightness upon receiving the image data, extracting, as the highlighted portion of the image date representing a portion irradiated with a light source, pixels ranking in a top 1% of brightness luminance in the image data, and calculating, as a pixel statistic which is an average value of the pixels in the highlighted portion, the average value being input levels of each of RGB components of the extracted pixels, wherein the determining includes measuring a distance between a plotted point of the color temperature and a point having the color temperature on the daylight locus, and determining whether the distance is within the certain distance.

7. A non-transitory computer readable storage medium having stored therein an image correction program, the image correction program causing a computer to execute a process comprising:

calculating a color temperature of a highlighted portion of image data captured with an image capturing unit;

determining whether the color temperature calculated in the calculating is within a certain distance with respect to a value on a daylight locus; and rewriting a conversion table that represents correlation between input levels and output levels of color components in accordance with the color temperature calculated in the calculating, and correcting, with reference to the conversion table, the image data using color balance correction when the color temperature is determined to be within the certain distance with respect to the value on the daylight locus in the determining, and obtaining a histogram of brightness upon receiving the image data, extracting, as the highlighted portion of the image date representing a portion irradiated with a light source, pixels ranking in a top 1% of brightness luminance in the image data, and calculating, as a pixel statistic which is an average value of the pixels in the highlighted portion, the average value being input levels of each of RGB components of the extracted pixels, wherein the correcting includes converting, for the color balance correction, a bright point, where colors are unnatural and biased, to white, and performing the same process on other pixels proportionately.

* * * * *

UNITED STATES PATENT AND TRADEMARK OFFICE
CERTIFICATE OF CORRECTION

| | |
|---|---|
| PATENT NO. | : 8,559,713 B2 |
| APPLICATION NO. | : 12/923366 |
| DATED | : October 15, 2013 |
| INVENTOR(S) | : Masahiro Watanabe |

It is certified that error appears in the above-identified patent and that said Letters Patent is hereby corrected as shown below:

In the Claims

In Column 8, Line 55, In Claim 5, delete "that that" and insert -- that --, therefor.
In Column 8, Line 66, In Claim 5, delete "date" and insert -- data --, therefor.
In Column 9, Line 27, In Claim 6, delete "date" and insert -- data --, therefor.
In Column 10, Line 23, In Claim 7, delete "date" and insert -- data --, therefor.

Signed and Sealed this
Eighteenth Day of February, 2014

Michelle K. Lee
*Deputy Director of the United States Patent and Trademark Office*